United States Patent
Deng et al.

(10) Patent No.: US 9,152,449 B2
(45) Date of Patent: *Oct. 6, 2015

(54) CO-LOCATION OF VIRTUAL MACHINES WITH NESTED VIRTUALIZATION

(75) Inventors: Yu Deng, Yorktown Heights, NY (US); Alexei Karve, Mohegan Lake, NY (US); Andrzej Kochut, Croton-on-Hudson, NY (US); Randy A. Rendahl, Raleigh, NC (US); Anca Sailer, Scarsdale, NY (US); Alla Segal, Mount Kisco, NY (US); Hidayatullah H. Shaikh, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 13/548,937

(22) Filed: Jul. 13, 2012

(65) Prior Publication Data

US 2014/0019963 A1  Jan. 16, 2014

(51) Int. Cl.
   *G06F 9/455* (2006.01)
(52) U.S. Cl.
   CPC .. *G06F 9/45558* (2013.01); *G06F 2009/45566* (2013.01)
(58) Field of Classification Search
   None
   See application file for complete search history.

(56) References Cited

U.S. PATENT DOCUMENTS

| | | | |
|---|---|---|---|
| 7,716,377 B2 | 5/2010 | Harris et al. | |
| 8,051,111 B2 * | 11/2011 | Noonan, III | 707/821 |
| 8,402,127 B2 * | 3/2013 | Solin | 709/223 |
| 2007/0233698 A1 * | 10/2007 | Sundar et al. | 707/10 |
| 2009/0199177 A1 * | 8/2009 | Edwards et al. | 718/1 |
| 2009/0282404 A1 * | 11/2009 | Khandekar et al. | 718/1 |
| 2010/0250878 A1 * | 9/2010 | Ichikawa et al. | 711/162 |
| 2010/0275241 A1 | 10/2010 | Srinivasan | |
| 2011/0107008 A1 | 5/2011 | Ben-Yehuda et al. | |
| 2011/0153909 A1 | 6/2011 | Dong | |
| 2011/0265082 A1 * | 10/2011 | Ashok et al. | 718/1 |
| 2012/0131574 A1 * | 5/2012 | Day et al. | 718/1 |

(Continued)

OTHER PUBLICATIONS

IBM; "A method for improved co-location of objects in a hierarchical scanning garbage collector";.ip.com/pubview/IPCOM000191570D; Jan. 7, 2010.

IBM; "A method and system for the Cost-Optimal Placement of Virtual Machines under Security Constraints";.ip.com/pubview/IPCOM000180995D; Mar. 23, 2009.

(Continued)

*Primary Examiner* — Abdullah Al Kawsar
*Assistant Examiner* — Dar-Eaum Nam
(74) *Attorney, Agent, or Firm* — Scully, Scott, Murphy & Presser, P.C.; Louis J. Percello, Esq.

(57) ABSTRACT

Co-locating a virtual machine with nested virtualization, in one aspect, may comprise receiving a list of one or more virtual machine instances to co-locate with associated configuration information. A parent virtual machine instance may be identified to host the one or more virtual machine instances. Virtual machine images associated with the one or more virtual machine instances may be consolidated. A composite parent virtual machine image may be created based on the consolidated virtual machine images and the parent virtual machine instance. The parent virtual machine instance may be configured to accommodate for capacity requirement of the one or more child virtual machine instances. The parent virtual machine instance may be started on a processor via the composite parent virtual machine image. The one or more virtual machine instances may be started within the parent virtual machine instance as one or more child virtual machine instances.

20 Claims, 4 Drawing Sheets

(56) References Cited

U.S. PATENT DOCUMENTS

2012/0243795 A1* 9/2012 Head et al. .................... 382/218
2012/0257820 A1* 10/2012 Sanghvi et al. ............... 382/159
2013/0111468 A1* 5/2013 Davis et al. ....................... 718/1

OTHER PUBLICATIONS

Sindelar, M.-et al.; "Sharing-Aware Algorithms for Virtual Machine Co-location"; SPAA'11; Proceedings of 23rd ACM Symposium on Parallelism in Algorithm Architecture;Jun. 2011.

* cited by examiner

CO-LOCATION OF VIRTUAL MACHINES WITH NESTED VIRTUALIZATION

FIELD

The present application relates generally to computers, computer systems and computer applications, and more particularly to virtual machines and provisioning of virtual machines.

BACKGROUND

Virtualization allows transforming a physical machine into multiple isolated logical machines. Virtual machines may be provisioned on hypervisors (e.g., KVM™, Xen™, VMWare™). Standard mechanisms involve placement algorithms that decide where to place the virtual machines in a computing infrastructure such as a cloud.

VMs may be co-located for various reasons, for example, to accommodate licensing costs for an operating system or the like (e.g., Windows™), for content aware inter VM sharing of memory pages, to reduce network bandwidth requirement, e.g., when response/transfer time between two or more tiers can be reduced drastically by co-locating VMs, to utilize private virtual local area network (VLAN) more akin to inter-process communication (IPC), to reduce power usage, and other reasons. When a new VM is provisioned that needs to be co-located with another VM on a hypervisor host or the like, a placement algorithm that is used to co-locate the VM on the computing infrastructure needs to be sharing-aware to be able to co-locate VMs based on particular conditions. For example, the computing system that is hosting the VM needs to be aware of, and passed explicitly with the various parameters for provisioning the VM. An indication or flag is usually provided to the placement algorithm and the placement algorithm needs to understand this request for co-location. Co-location can be performed in chains if requests are provisioned sequentially or in groups if simultaneously. An example of a co-location constraint may be: <resource_colocation name="colocate" rsc="resource1" withrsc="resource2" confidence="MAXCONFIDENCE"/>. An example of anti-colocation constraint may be: <resource_colocation name="anti-colocate" rsc="resource1" withrsc="resource2" confidence="–MAXCONFIDENCE"/>. Constraints may have confidence in between the – and +MAXCONFIDENCE, which are indications of the probability that the requested co-location can be performed either on same rack or container housing the racks or within a particular pod or data center. Anti-colocation is usually easier because a user can simply provision in another datacenter or in a completely different cloud environment without any changes to placement algorithm.

BRIEF SUMMARY

A method of co-locating a virtual machine with nested virtualization, in one aspect, may comprise receiving a list of one or more virtual machine instances to co-locate and associated configuration information needed to create the one or more virtual machine instances. The method may also include consolidating virtual machine images associated with the one or more virtual machine instances. The method may further include creating a composite parent virtual machine image based on the consolidated virtual machine images and a parent virtual machine instance. The method may yet further include setting a configuration of the parent virtual machine instance to accommodate for capacity requirement of the one or more child virtual machine instances. The method may still yet include starting the parent virtual machine instance on a host via the composite parent virtual machine image. The method may also include starting the one or more virtual machine instances within the parent virtual machine instance as one or more child virtual machine instances. The method may further include configuring the parent virtual machine instance and the one or more child virtual machine instances on the host.

A method of co-locating a virtual machine with one or more running child virtual machine instances, in one aspect, may comprise receiving information associated with a new virtual machine instance to co-locate with other child VM instance. The method may also include consolidating a virtual machine image associated with the new virtual machine instance with a list of existing one or more child virtual machine images in the parent virtual machine instance. The method may further include updating resource capacity of the parent virtual machine instance to accommodate resource requirement of the new virtual machine instance. The method may yet further include starting the new virtual machine instance from the parent virtual machine instance as a new child virtual instance of the parent virtual machine instance. The method may still further include configuring the parent virtual machine instance and the new child virtual machine instance.

A method of co-locating a virtual machine with nested virtualization, in another aspect, may comprise receiving a list of one or more virtual machine instances to co-locate, the list including a parent virtual machine instance as a container for hosting the one or more child virtual machine instances. The method may further include consolidating virtual machine images associated with the parent virtual machine instance and the one or more child virtual machine instances. The method may also include creating a composite parent virtual machine image based on the consolidated virtual machine images. The method may further include setting a configuration of the parent virtual machine instance to accommodate for capacity requirement of the one or more child virtual machine instances. The method may yet still include starting the parent virtual machine instance on a processor by running the composite parent virtual machine image. The method may also include executing the one or more child virtual machine instances within the parent virtual machine instance.

A system for co-locating a virtual machine with nested virtualization, in one aspect, may comprise a host machine. A co-location module may be operable to receive a list of one or more virtual machine instances to co-locate and associated configuration information needed to create the one or more virtual machine instances. The co-location module may be further operable to consolidate virtual machine images associated with the one or more virtual machine instances and create a composite parent virtual machine image based on the consolidated virtual machine images and a parent virtual machine instance. The co-location module may be further operable to set a configuration of the parent virtual machine instance to accommodate for capacity requirement of the one or more child virtual machine instances. The co-location module may be further operable to start the parent virtual machine instance on the host machine via the composite parent virtual machine image and start the one or more virtual machine instances within the parent virtual machine instance as one or more child virtual machine instances. The co-location module may be further operable to configure the parent virtual machine instance and the one or more child virtual machine instances on the host.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
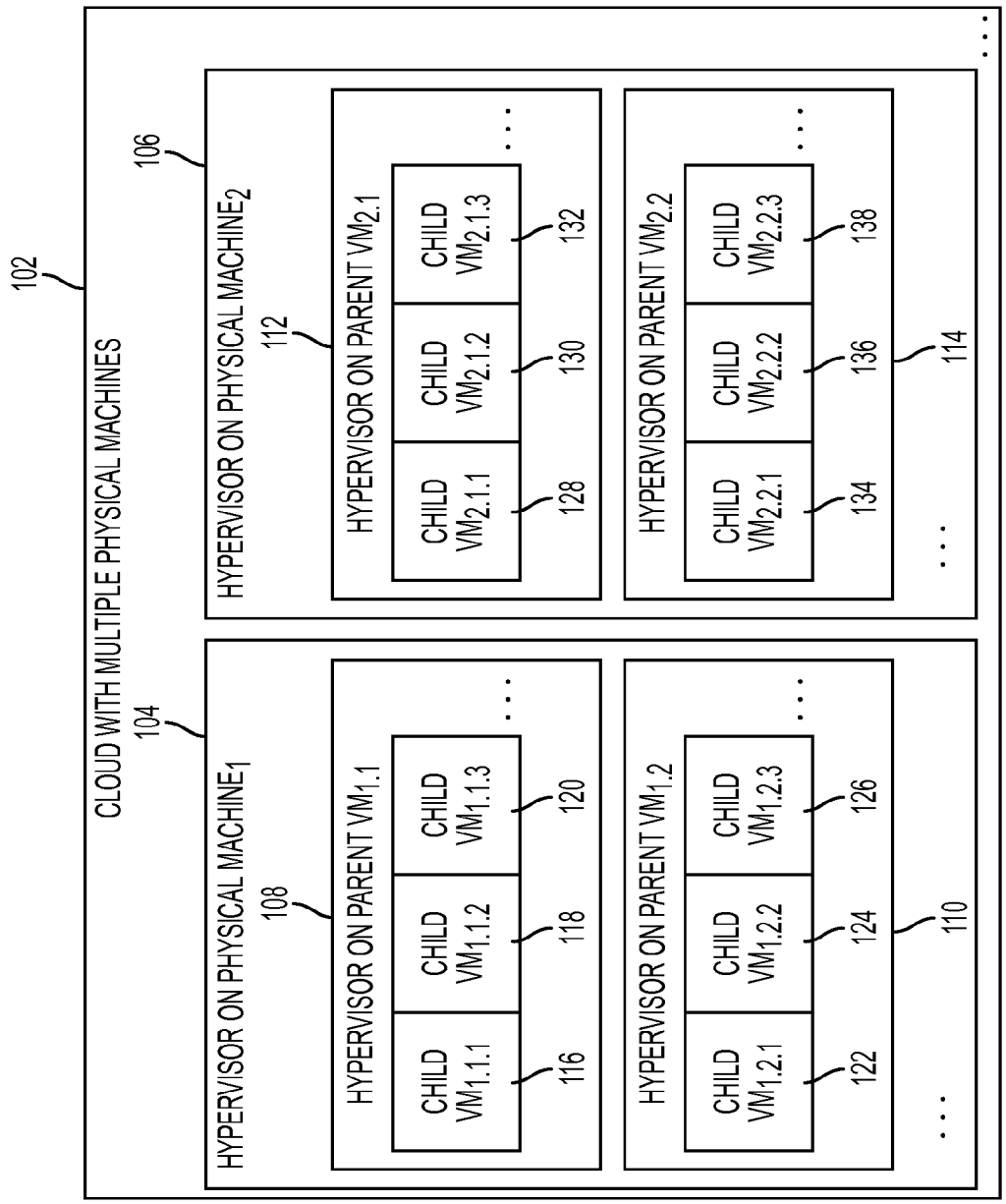
FIG. 1 is a system diagram showing co-located child VMs in parent VMs in one embodiment of the present disclosure.

It is understood in advance that although this disclosure includes a description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service oriented with a focus on statelessness, low coupling, modularity, and semantic interoperability. At the heart of cloud computing is an infrastructure comprising a network of interconnected nodes.

In various embodiments of the present disclosure, a mechanism to co-locate virtual machine (VM) instances may be provided. For example, an instance of a VM may be placed or created in the same host (such as hypervisor) as another VM. The VMs in the same host are referred to as being co-located. In one embodiment of the present disclosure, co-location may be achieved with nested virtualization. All VMs to be co-located may be placed within a parent VM and may be provisioned within the single provisioning action from a computing infrastructure such as the cloud computing environment. In one embodiment of the present disclosure, no changes need be made to a placement algorithm or the computing infrastructure (such as the cloud) to understand co-location. In one embodiment of the present disclosure, a composite appliance may be provided that includes multiple child VMs provisioned in a single parent VM, forming mini-computing infrastructure (such as a mini cloud), providing the user granular control over capacity and usage of child VMs.

In one embodiment of the present disclosure, a VM instance is provisioned with sufficient capacity to host one or more child VM instances that are to be co-located. Additional child VMs may be provisioned by a computer system virtualization environment or computing infrastructure such as the cloud, directly within the hosting parent VM instance to ensure co-location. A simple dynamic provisioning is also possible without the explicit support from the computing infrastructure (e.g., Cloud computing) that hosts the parent VM, if for example images (files) are already present and/or accessible on the parent VM. Composite appliances containing multiple VMs can be provisioned as a single composite entity without any changes to a computing virtualization environment (e.g., Cloud computing) that supports single VM instances. The ease of cloning a composite appliance according to one embodiment of the present disclosure may reduce configuration errors and provisioning requests. In one embodiment of the present disclosure, no change is required to the Internet Protocol (IP) addresses of child VM instances, thus the complete appliance can be ported to another hypervisor or the like without requiring any changes to IP addresses of child VMs. A parent VM instance may act as a Dynamic Host Configuration Protocol (DHCP) server and assign local IP addresses to child VMs without requesting any IP resources from the computing virtualization environment (e.g., Cloud computing) or computing infrastructure that hosts the parent VM. For instance, in one embodiment of the present disclosure, when the parent VM allocates private IP addresses, those addresses are not visible from outside of the parent VM. Therefore, there are at least the following benefits: The Cloud or the like does not need to provide IP addresses for the child VMs; Multiple instances from the Parent image (with all the children VMs repeated in each parent VM) can be created. Each parent may allocate the same IP addresses for the children.

In one aspect, Network Address Translation (NAT) and port forwarding may be achieved by the parent VM instance forwarding external requests on required ports to required child VMs and blocking the remaining requests. Thus, only the parent VM needs to be directly accessible to the outside network, e.g., remote computers or the network such as the Internet. Requests from such remote systems may be handled by the parent VM that may act to perform network address translation and/or port forwarding to the appropriate child VMs hosted by the parent VM. Yet in another aspect, a single firewall on the parent VM may be sufficient for trusted child VMs. In one embodiment of the present disclosure, the user has administrative control over this mini-virtualization or cloud environment. In one aspect, better isolation of a group of child VMs belonging to an appliance may be provided within a single parent VM.

In one embodiment of the present disclosure, with a computing infrastructure (e.g., cloud computing) that supports dynamic resource management, multiple child VMs, also referred to as nodes, may be started within a cluster without copying a VM image from a storage server. A cluster is a group of VM instances that have been created from the same VM image. For example, another instance of VM in the cluster may be started by using the VM image in the existing composite image of parent VM and increasing resources such as the memory and central processing unit (CPU) resources of parent VM. Increasing such resources may be performed by sending a request to the computing infrastructure (e.g., Cloud computing). Since an image in the cluster is already present on the parent VM, another instance may be started locally using copy-on-write (COW) or local image copy, for instance, allocating additional storage if needed. As hardware support for multi-level virtualization improves, this type of provisioning of appliances with multiple VMs may provide more flexibility and reliability in provisioning.

FIG. 1 is a system diagram showing co-located child VMs in parent VMs in one embodiment of the present disclosure. One or more parent VMs 108, 110, 112, 114 may be hosted by physical machines 104, 106 in a cloud computing infrastructure 102. A virtual machine can be formed into many machines with its own hypervisor with nesting, e.g., as shown at 108 with 116, 118, 120, shown at 110 with 122, 124, 126, shown at 112 with 128, 130, 132, and also shown at 114 with 134, 136, 138. It is noted that the structure shown in FIG. 1 is for example only. Thus, any number of physical machines, parent VMs and child VMs may be provisioned on a computing infrastructures such as in a cloud computing environment. A parent VM (e.g., 108) may have one or more cluster of child VMs. For example, child VMs 116, 118 may be of a cluster, and child VM 102 of a different cluster.

In one embodiment of the present disclosure, a parent VM and one or more child VMs may be packaged as a composite appliance that can be deployed on a computing infrastructure, e.g., having a hypervisor or the like that can host a VM. An appliance integrates software products (e.g., operating system and applications) into a single software platform. The appliance of the present disclosure in one embodiment may include a parent VM image and one or more child VM images, and their configuration parameters or specifications.

Figure 2:
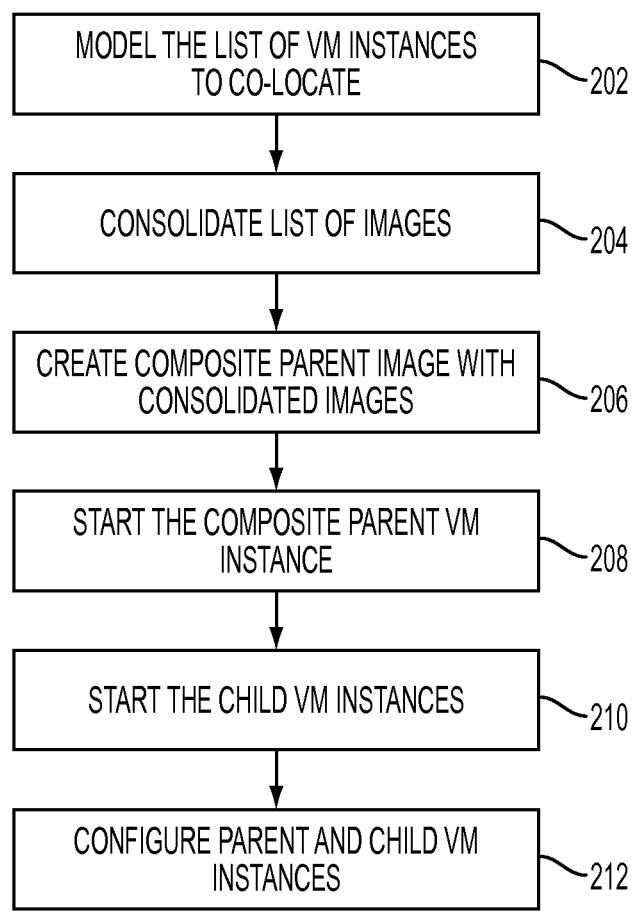
FIG. 2 is a flow diagram illustrating a method of creating co-located VM Instances in one embodiment of the present disclosure.

FIG. 2 is a flow diagram illustrating a method of creating co-located VM instances in one embodiment of the present disclosure. At 202, a list modeled with one or more VM Instances to co-locate are received. The list may identify each VM instance by a unique identifier. The model includes the image and configuration information required to create the VM Instances. The list in one embodiment of the present disclosure includes at least the identifications of one or more child virtual machine instances, which a parent virtual machine instance would host, for example, a list of images and desired instances of the images to be created. This list may be provided as co-location constraints in a metadata file. The list of VMs to co-locate may also be selected by modeling via a graphical user interface (GUI). In this respect, a hosting VM (parent VM) may be specified as a container type object on the modeling GUI. Each VM instance in the model is associated with the image with required configuration information, also referred to as configuration parameters. In another aspect, the deployed instances may be selected by capturing images and bundling them from those running instances.

At 204, the VM images of the VMs in the modeled list are consolidated. A VM image file includes a VM executable and other information, formatted as blocks of data. The consolidation may reduce the image blocks to be accessed when instance(s) are created. For instance, the list of VMs may include multiple VM instances that could be created from the same VM image. In such case, only one copy of the image need be included in the consolidated version of the images. Thus, consolidation would remove duplicate VM images. Additionally, the different images may include the same base OS or shared software. This can result in reducing the blocks by requiring only the non-redundant blocks to be stored in the parent image.

At 206, a composite parent image with consolidated images is created. In one embodiment of the present disclosure, this creates a single image that is the parent image with all needed child image files inside it to be able to be instantiated as the composite image or appliance. In another embodiment, the composite image may include external references to the image. The configuration of parent VM may be set to accommodate for the capacity requirements of all child VMs. The CPU, memory, disks space and network requirements for the parent VM are often less than the combined sum of the corresponding resource requirements of individual child VMs.

At 208, the composite parent VM instance may be deployed to a computing infrastructure, and started, for instance, to run on a hypervisor or the like. The parent VM may allow for reduced resource usage thus allowing overallocation of shared resources on the hypervisor of physical host.

At 210, one or more of the child VM instances may be started. For example, the child VMs may be started manually or through an automated activation script that may also optionally update the child images. A user may directly log on the parent VM and start one or more of the child VMs.

At 212, parent and child VM instances are configured. For example, the Networking, Network address translation, firewall may be set and one or more configuration scripts may be executed to configure the parent and/or one or more child VM instances to run its functionalities. The one or more configuration scripts may be part of virtual machine image. The one or more configuration scripts may be also provided as parameter(s) to the parent virtual machine image. If they are provided as parameters, then the parameter values may be provided and/or copied to the image during instance creation.

Figure 3:
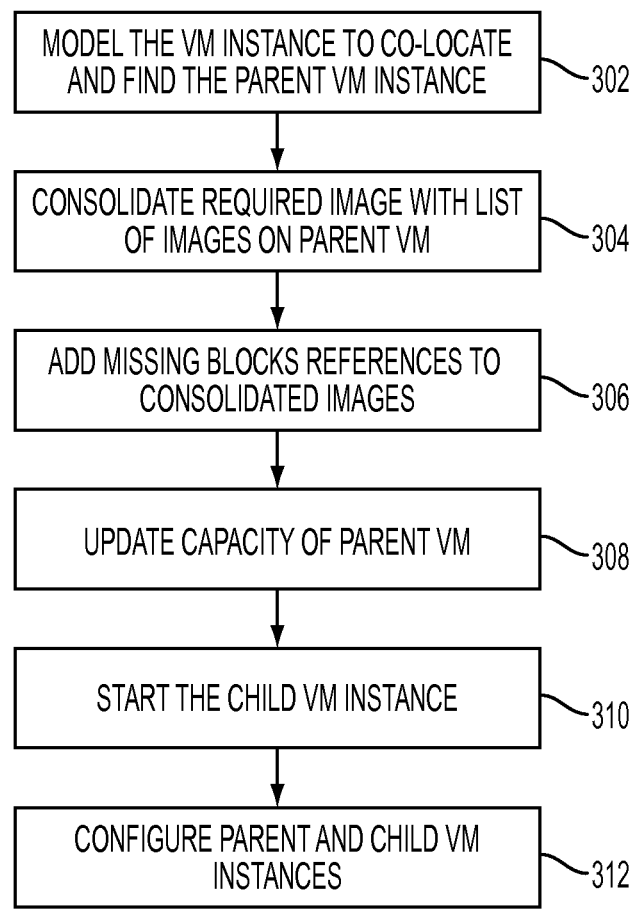
FIG. 3 is a flow diagram illustrating a method of co-locating with running VM instances in one embodiment of the present disclosure.

FIG. 3 is a flow diagram illustrating a method of co-locating a VM where there are already one or more running VM instances, in one embodiment of the present disclosure. At 302, a model of the VM instance to co-locate and information about the parent VM instance on which the new VM instance is to be co-located is identified. The VM instance to co-locate may be provided as co-location constraint in a metadata file. The VM instance to co-locate may also be selected using a GUI.

At 304, the image of the VM instance to be co-located is consolidated with a list of images on the parent VM. The consolidation may reduce the image blocks to be accessed (e.g., from a remote storage server that store VM instance image and associated data) for the new VM instance(s).

At 306, any missing blocks of any of the images in the list are added to the consolidated images. If an instance for the image already exists and another instance needs to be created for same image, then there are no missing blocks. On the other hand, even if the new VM instance's image is different from the one or more images of the existing VM instance or instances, there may be some common blocks between the new and existing images. In that case, only those blocks that are not in common need be copied from a source storage. Hence, the entire image for the new VM instance need not be copied.

At 308, the capacity of the parent VM may be updated, for example to accommodate the resource requirements of the new co-located VMs (new child VMs), for example, if needed or desired.

At 310, the new co-located child VM instances may be started. The new VM may be started manually and/or through an automated activation script that may also optionally update the new VM image.

At 312, the parent and child VM instances may be configured. For example, the networking, network address translation, firewall may be set and one or more configuration scripts may be executed to configure and update the parent and the child VM instances to run its functionalities.

Figure 4:
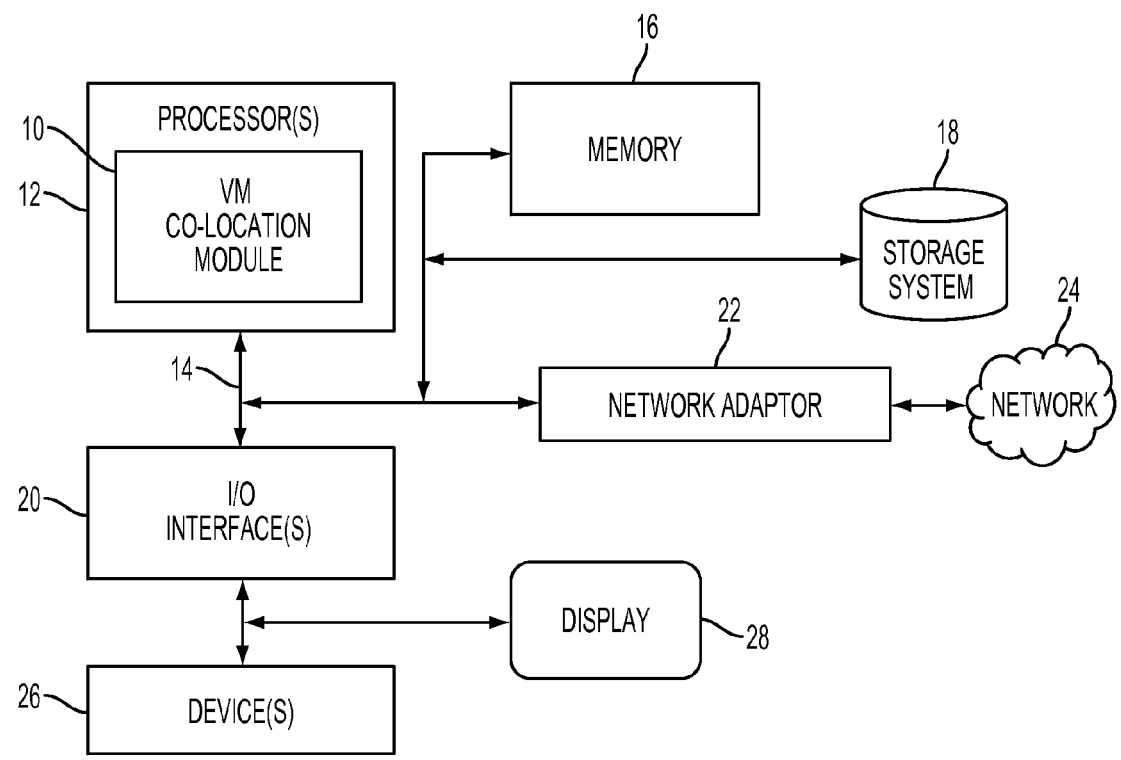
FIG. 4 illustrates a schematic of an example computer or processing system that may implement the virtual machine co-location system in one embodiment of the present disclosure.

FIG. 4 illustrates a schematic of an example computer or processing system that may implement the virtual machine co-location system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a virtual machine co-location module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of co-locating a virtual machine with nested virtualization, comprising:
   receiving by a processor, a list of virtual machine instances to co-locate and associated configuration information needed to create the virtual machine instances;
   consolidating virtual machine images associated with the virtual machine instances;
   creating a composite parent virtual machine image based on the consolidating;
   starting one of the virtual machine instances as a parent virtual machine instance on a host machine via the composite parent virtual machine image;
   starting one or more of the virtual machine instances within the parent virtual machine instance via the composite parent virtual machine image as one or more child virtual machine instances; and
   configuring the parent virtual machine instance and the one or more child virtual machine instances on the host machine based on the configuration information, the parent virtual machine instance configured to accommodate for capacity requirement of all of the virtual machine instances based on the configuration information,
   wherein the virtual machine instances to co-locate contained in the parent virtual machine image are provisioned within a single provisioning action on the host machine,
   wherein said configuring the parent virtual machine instance and the one or more child virtual machine instances includes setting one or more networking parameters, network address translation and firewall parameters,
   wherein the parent virtual machine instance receives all communications from a remote network addressed to the parent virtual machine instance and the one or more child virtual machine instances, and forwards the communications to an appropriate one or more of the child virtual machine instances.

2. The method of claim 1, wherein the list is received as a co-location constraint in a metadata file.

3. The method of claim 1, wherein the list is received via a user specifying the one or more VM instances via a graphical user interface.

4. The method of claim 1, wherein the consolidating removes duplicate virtual machine image blocks.

5. The method of claim 1, wherein said consolidating comprises including only one of the virtual machine images in the composite parent virtual machine image.

6. The method of claim 1, wherein the parent virtual machine instance provides a firewall protection mechanism for the one or more child virtual machine instances.

7. The method of claim 1, wherein said starting of the parent virtual machine instance includes executing one or more configuration scripts on the composite parent virtual machine image, the one or more configuration scripts for implementing at least some of the configuration information.

8. The method of claim 7, further including the parent virtual machine instance accommodating for capacity of the one or more child virtual machine instances allowing overallocation on a hypervisor running on the host machine.

9. The method of claim 1, wherein said starting of the one or more virtual machine instances includes executing the one or more virtual machine images associated with the one or more virtual machine instances in the composite parent virtual machine image.

10. A method of co-locating a virtual machine with one or more running child virtual machine instances, comprising:
    receiving by a host machine information associated with a new virtual machine instance to co-locate with the one or more child virtual machine instances running under a parent virtual machine instance, the parent virtual machine instance hosted by a hypervisor running on the host machine;
    consolidating a virtual machine image associated with the new virtual machine instance with a composite image associated with the one or more child virtual machine instances and the parent virtual instance;
    updating a resource capacity of the parent virtual machine instance to accommodate one or more resource requirements of the new virtual machine instance;
    starting the new virtual machine instance from the parent virtual machine instance as a new child virtual machine instance of the parent virtual machine instance; and
    configuring the parent virtual machine instance and the new child virtual machine instance,
    wherein virtual machines contained in the consolidated composite image are enabled to be provisioned within a single provisioning action,
    wherein said configuring of the parent virtual machine instance and the new child virtual machine instance includes setting one or more networking parameters, network address translation and firewall parameters associated with one or more of the parent virtual machine instance and the new child virtual machine instance,
    wherein the parent virtual machine instance provides a firewall protection mechanism for the new child virtual machine instance.

11. The method of claim 10, wherein the new virtual machine instance to co-locate is received as a co-location constraint in a metadata file.

12. The method of claim 10, wherein the new virtual machine instance to co-locate is received via an entry in a graphical user interface.

13. The method of claim 10, wherein the consolidating includes:
    determining whether the composite image associated with the parent virtual machine instance already has the virtual machine image associated with the new virtual machine instance, and only if the composite image does not include the virtual machine image, copying at least some blocks of the virtual machine image associated with the new virtual machine instance from a storage server into the composite image.

14. The method of claim 13, wherein the consolidating further includes:
    in response to determining that the composite image has the virtual machine image associated with the new virtual machine instance, determining whether there are one or more blocks missing from the virtual machine image associated with the new virtual machine instance in the composite image, and in response to determining that there are one or more blocks missing from the virtual machine image associated with the new virtual machine instance in the composite image, adding the one or more missing blocks to the composite image from the virtual machine image associated with the new virtual machine instance.

15. The method of claim 10, wherein the parent virtual machine instance is configured to receive communications from a remote network addressed to the parent virtual machine instance and forwarding the communications to the new child virtual machine instance.

16. The method of claim 10, wherein a user is enabled to start the new child virtual machine instance by logging onto the parent virtual machine instance.

17. The method of claim 10, wherein the new child virtual machine instance is started via a script executed automatically within the parent virtual machine instance.

18. A method of co-locating a virtual machine with nested virtualization, comprising:
- a physical host machine;
- a co-location module receiving a list of one or more child virtual machine instances and a parent virtual machine instance as a container for hosting the one or more child virtual machine instances and associated configuration information needed to create the one or more child virtual machine instances;
- consolidating virtual machine images associated with the parent virtual machine instance and the one or more child virtual machine instances;
- creating a composite parent virtual machine image based on the consolidating;
- setting a configuration of the parent virtual machine instance to accommodate for one or more capacity requirements of the one or more child virtual machine instances;
- starting the parent virtual machine instance on the host machine by running the composite parent virtual machine image on the host machine;
- and executing the one or more child virtual machine instances within the parent virtual machine instance;
- wherein virtual machines contained in the consolidated virtual machine image are provisioned within a single provisioning action without changes to a computing virtualization environment of the host machine that supports a single virtual machine,
- wherein said starting of the parent virtual machine instance includes executing one or more configuration scripts on the composite parent virtual machine image, the one or more configuration scripts for implementing at least some of the configuration information,
- further including the parent virtual machine instance accommodating for capacity of the one or more child virtual machine instances allowing overallocation on a hypervisor running on the host machine.

19. The method of claim 18, wherein the one or more child virtual machine instances are started manually by a user logged onto the parent virtual machine instance.

20. The method of claim 18, wherein the one or more child virtual machine instances are started automatically by executing an automatic script.

* * * * *